United States Patent [19]

Martinez

[11] Patent Number: 6,146,088
[45] Date of Patent: Nov. 14, 2000

[54] PROCESS FOR THE ROTATIONAL DRIVING OF A TURBINE BY MEANS OF AN EJECTOR DEVICE

[76] Inventor: Michéle Martinez, Lieu Dit Couchens, 82210 Saint Nicolas de la Grave, France

[21] Appl. No.: 09/171,546

[22] PCT Filed: Apr. 23, 1997

[86] PCT No.: PCT/FR97/00727

§ 371 Date: Oct. 21, 1998

§ 102(e) Date: Oct. 21, 1998

[87] PCT Pub. No.: WO97/40258

PCT Pub. Date: Oct. 30, 1997

[30]    Foreign Application Priority Data

Apr. 23, 1996 [FR]   France ................................. 96 05207

[51] Int. Cl.⁷ ........................................................ F01D 19/00
[52] U.S. Cl. .................................. 415/1; 415/30; 415/37; 415/151
[58] Field of Search ............................... 415/1, 30, 36, 415/37, 42, 46, 116, 119, 117, 151, 150, 157, 158, 181

[56]                 References Cited

U.S. PATENT DOCUMENTS

| 2,235,763 | 3/1941 | Horton . | |
| 2,975,517 | 3/1961 | Britain . | |
| 4,372,113 | 2/1983 | Ramer . | |
| 5,141,391 | 8/1992 | Acton et al. | 415/119 |
| 5,553,995 | 9/1996 | Martinez | 415/1 |
| 5,813,828 | 9/1998 | Norris | 415/115 |

FOREIGN PATENT DOCUMENTS

| 364 581 | 3/1981 | Austria . |
| 1085771 | 2/1955 | France . |
| 2 682 428 | 4/1993 | France . |
| 2 695 678 | 3/1994 | France . |
| 30 12 388 | 10/1981 | Germany . |
| 38 38 798 | 5/1990 | Germany . |
| 97143 | 12/1922 | Switzerland . |
| 249719 | 7/1947 | Switzerland . |
| 2 059 515 | 4/1981 | United Kingdom . |
| 2 074 249 | 10/1981 | United Kingdom . |
| WO 89/07194 | 8/1989 | WIPO . |

*Primary Examiner*—Edward K. Look
*Assistant Examiner*—Ninh Nguyen
*Attorney, Agent, or Firm*—O'Melveny & Myers LLP

[57]                ABSTRACT

The method enables a turbine to be used at varying speeds and powers. An injector (15) is placed in a channel (3) downstream from a turbine (4); it creates a Venturi effect and converts pressure control into control of the mass flow rate of a mixed fluid. Sensors (18) and a regulator (17) enable the speed of the turbine (4) to be matched to a reference speed. A variant consists in placing a suction generator at the outlet of the section (5) of the channel (3).

18 Claims, 3 Drawing Sheets

PROCESS FOR THE ROTATIONAL DRIVING OF A TURBINE BY MEANS OF AN EJECTOR DEVICE

The present invention relates to a method of driving a turbine in rotation and to a corresponding turbine device.

Turbines have been known for a long time, and they are essentially constituted by a blade-carrying hub that is caused to rotate by a fluid (gas, liquid) passing therethrough.

In known manner, using a fluid to drive a turbine enables the energy of the fluid to be transferred to the rotary shaft of the turbine. For example, rotation of the shaft can be used to drive an alternator to produce electricity, or to drive various tools (drill, saw, . . . ).

At present, the problems with known devices lie in the high flow speeds that are required for obtaining the highest possible powers. Unfortunately, such high flow speeds lead to high levels of disturbance; for example, when the fluid is a gas, the following are created:

shock waves; and expansion or compression streams that appear on the various components of the device.

The consequences of such disturbances include the following:

the components of such devices need to have special shapes that are accurate and optimized (which implies an operating range that is limited or even very limited);

said components must be mechanically strong enough to withstand the forces induced by the vibratory phenomena that accompany such disturbances; and said disturbances generate acoustic phenomena that are often very loud.

Another limit on the use of prior turbine devices lies in the high or very high speeds of rotation of such devices.

By using the tapered throat or Venturi effect, it is possible to entrain a secondary fluid by injecting a primary fluid through a nozzle. Numerous devices implement this effect, and in particular:

tapered throat thermal thrust systems generate force by creating a pressure difference between the upstream and downstream ends of the system; the device described in French patent FR 522 163 thus takes a fraction of the energy of a gas flow which is characterized mainly in terms of its speed to drive a turbine to compress the fuel and oxidizer that are required to enable the system to operate;

thermal systems such as the system described in British patent 1 410 543 in which the temperature of the hot source is too high to be used directly, and which are designed to perform a cooling effect by dilution; and systems of the kinds described in French patents 91/12711 and 92/11005 known as MAM systems; such systems enable powers to be obtained that are comparable to those obtained with conventional turbines, but with speeds of turbine rotation and of fluid flow that are compatible with flows having little disturbance.

An object of the present invention is to mitigate the above drawbacks, and in particular to provide a turbine whose nominal operating point is not associated with a transonic flow speed either overall or in local portions of said flow.

It is recalled that an operating point is characterized by a pair of values (speed of rotation, power) or (speed of rotation, torque). In the present description, the term "nominal operating point" is used to designate an operating point corresponding to a power maximum.

One of the objects of the invention is to obtain results that are comparable with MAM systems while eliminating said non-uniformities from the upstream flow of the turbine.

To this end, the present invention provides a method of driving a turbine in rotation, said turbine being connected to a upstream fluid feed channel and to a downstream ejection channel, said method being characterized in that it consists in:

admitting a primary fluid into the upstream channel, said upstream channel converging from upstream to downstream, and said primary fluid having in the downstream portion of said upstream channel a pressure $Pp$ which is lower than the pressure $Pa$ of the external ambient medium, and a speed $Vp$ compatible with a flow having little disturbance, and a mass flow rate $Dp$;

driving the turbine in rotation by passing said primary fluid over the blades of said turbine;

injecting a secondary fluid into the downstream ejection channel, said secondary fluid, on injection, presenting a determined pressure $Ps$ greater than the pressure $Pa$, a determined speed $Vs$ greater than $Vp$, and a determined mass flow rate $Ds$;

intimately mixing the primary and secondary fluids in the downstream channel; and ejecting said mixture at the outlet of the downstream channel at a pressure which is close to the pressure $Pa$ of the ambient medium.

A variant of said method consists in driving a turbine in rotation, said turbine being connected to an upstream fluid feed channel and to a downstream ejection channel, said variant of said method being characterized in that consists in:

admitting a fluid into the upstream channel, said channel converging from upstream to downstream, and said fluid having in the downstream portion of said upstream channel a pressure $Pp$ which is lower than the pressure $Pa$ of the external ambient medium, and a speed $Vp$ compatible with a flow having little disturbance, and a mass flow rate $Dp$;

driving said turbine in rotation by passing said fluid over the blades of said turbine; and ejecting said fluid at the outlet of the downstream channel at a defined pressure $Pej$ lower than the pressure $Pa$ of the external ambient medium.

Another variant of said method consists in driving a turbine in rotation, said turbine being connected to an upstream fluid feed channel and to a downstream ejection channel, said variant of said method being characterized in that it consists in:

admitting a primary fluid into the upstream channel, said upstream channel converging from upstream to downstream, and said primary fluid having in the downstream portion of said upstream channel a pressure $Pp$ which is lower than the pressure $Pa$ of the external ambient medium, and a speed $Vp$ compatible with a flow having little disturbance, and a mass flow rate $Dp$;

driving the turbine in rotation by passing said primary fluid over the blades of said turbine;

injecting a secondary fluid into the downstream ejection channel, said secondary fluid, on injection, presenting a determined pressure $Ps$ greater than the pressure $Pa$, a determined speed $Vs$ greater than $Vp$, and a determined mass flow rate $Ds$;

intimately mixing the primary and secondary fluids in the downstream channel; and ejecting said mixture at the outlet of the downstream channel at a defined pressure $Pej$ lower than the pressure $Pa$ of the ambient medium.

Advantageously, the method of the invention and its variants is a method of driving a turbine in rotation at a reference speed of rotation that is variable, and it further consists in:

continuously measuring a magnitude representative of the real speed of rotation of the turbine;

converting said magnitude into terms of speed;

comparing said speed with the reference speed of rotation; and continuously modifying one or more flow parameters so that the nominal operating point of the turbine corresponds to the reference operating point.

Thus, injecting a secondary fluid at a pressure and a speed that are higher than those of the primary fluid serves to entrain the primary fluid from upstream to downstream so that it passes between the blades of the turbine. This entrainment effect is known as the tapered throat or Venturi effect: it creates suction in the upstream portion of the downstream ejection channel. Said effect is used as in MAM systems to transform energy: the energy of the secondary fluid injected at a low mass flow rate but at high speed and pressure is used to set into motion by the Venturi effect a large mass flow rate of primary fluid with a flow that has little disturbance. In contrast, the non-uniformities in the speed profile upstream from the turbine are greatly reduced by injecting the secondary fluid downstream from the turbine.

Also, as in MAM systems, by acting continuously on the pressure and/or the speed of the secondary fluid and/or on any other dimensional or functional parameter of the turbine device, the method of the invention makes it possible to match the nominal operating point of the device to the reference operating point. The dimensional parameters can be the following: the primary fluid inlet section; the secondary fluid injection section; the outlet section of the ejection channel. The functional parameters can be the following: the method of injection as defined by its direction (axial, helical), its position (peripheral, axial, median), its shape (annular, cylindrical nozzle), the injection pressure, and/or the mass flow rate of the secondary fluid.

Advantageously, because the secondary fluid is injected into the downstream channel, the mixing of the primary and secondary fluids can be improved by injecting said secondary fluid at a speed that is clearly supersonic and/or that generates energetic expansion streams in the vicinity of the injection of said secondary fluid.

The present invention also provides a turbine device implementing the above-described method and its variants, said device comprising, inside a body: an upstream fluid feed channel, a turbine, and a downstream fluid ejection channel, said device being characterized in that it further comprises:

means for injecting a secondary fluid into the downstream channel, said secondary fluid having determined pressure, speed, and mass flow rate;

means for admitting a primary fluid into the upstream channel, said primary fluid having pressure and speed that are lower than those of the secondary fluid;

means for mixing the primary and secondary fluids; and means for ejecting said mixture at a pressure close to the pressure Pa of the ambient medium.

A variant of said turbine device implementing the above-described method and its variants relates to a device comprising, inside a body, an upstream fluid feed channel, a turbine, and a downstream fluid ejection channel, said variant being characterized in that it further comprises:

means for admitting a fluid into the upstream channel, said fluid having a pressure Pp in the downstream portion of said means that is lower than the pressure Pa of the ambient medium;

means for ejecting said fluid at a defined pressure Pej lower than the pressure Pa of the ambient medium; and means for implementing said pressure Pej.

Another variant of said turbine device implementing the above-described method and its variants relates to a device comprising inside a body: an upstream fluid feed channel, a turbine, and a downstream fluid ejection channel, said variant being characterized in that it further comprises:

means for injecting a secondary fluid into the downstream channel, said secondary fluid having determined pressure, speed, and mass flow rate;

means for admitting a primary fluid into the upstream channel, said primary fluid having pressure and speed that are smaller than those of the secondary fluid;

means for mixing the primary and secondary fluids;

means for ejecting said mixture at a defined pressure Pej lower than the pressure Pa of the ambient medium; and means for implementing said pressure Pej.

Advantageously, the device and its variants are adapted to drive a turbine in rotation at a reference speed that is variable, and for this purpose they include monitoring and regulation means comprising:

means for measuring a magnitude representative of the speed of rotation of the turbine;

means for acquiring the measured speed of rotation;

processor means adapted to compare the measured speed of rotation with a reference speed of rotation;

actuators adapted to regulate the functional and/or dimensional parameters of the flow to cause the measured value of the speed of rotation to coincide with the reference value of said speed; and a stop valve.

The reference speed of rotation is determined for a given application. For example, when machining by means of a rotary tool, such a device or its variants can be used to drive a milling tool directly at a speed of 32,000 revolutions per minute (rpm).

Other objects, characteristics, or advantages of the invention appear from the following description by way of example and with reference to the accompanying figures, in which.

Figure 1:
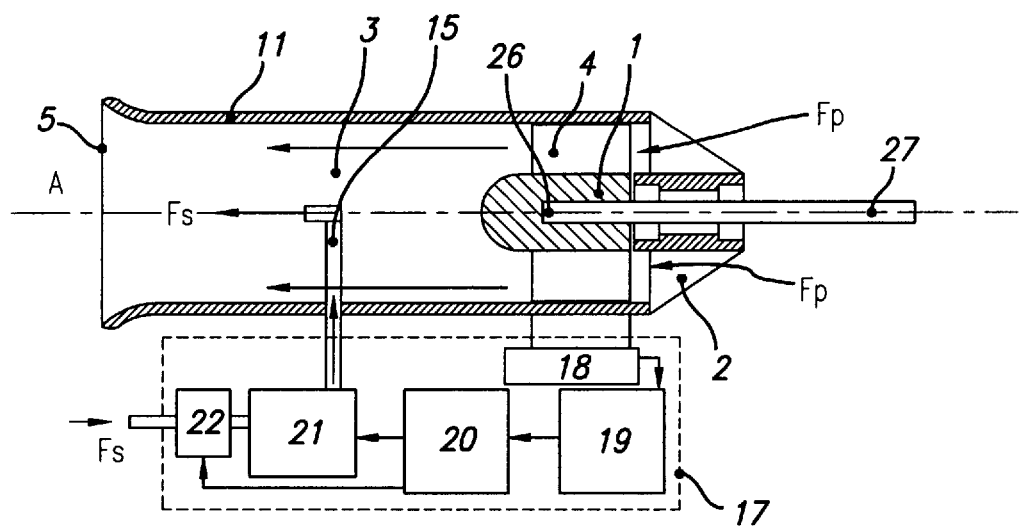
FIG. 1 is a diagrammatic longitudinal section view showing the operating method of the invention.

As already mentioned, the object of the present invention is to rotate a turbine at relatively low speed, e.g. about 0 to 60,000 rpm for a turbine having a diameter of 80 mm, but to do so at high torque.

To this end, the method of the invention for driving a turbine in rotation is described below.

The turbine is placed between an upstream fluid feed channel and a downstream ejection channel; the method of the invention consists in:

admitting a primary fluid into the upstream channel, said upstream channel converging from upstream to downstream, and said primary fluid having in the downstream portion of said upstream channel a pressure Pp which is lower than the pressure Pa of the external ambient medium, and a speed Vp compatible with a flow having little disturbance, and a mass flow rate Dp;

driving the turbine in rotation by passing said primary fluid over the blades of said turbine;

injecting a secondary fluid into the downstream ejection channel, said secondary fluid, on injection, presenting a determined pressure Ps greater than the pressure Pa, a determined speed Vs greater than Vp, and a determined mass flow rate Ds;

intimately mixing the primary and secondary fluids in the downstream channel; and ejecting said mixture at the outlet of the downstream channel at a pressure which is close to the pressure Pa of the ambient medium.

Advantageously, a variant of said method consists in:

admitting a fluid into the upstream channel, said channel converging from upstream to downstream, and said fluid having in the downstream portion of said upstream channel a pressure Pp which is lower than the pressure Pa of the external ambient medium, and a speed Vp compatible with a flow having little disturbance, and a mass flow rate Dp;

driving said turbine in rotation by passing said fluid over the blades of said turbine; and ejecting said fluid at the outlet of the downstream channel at a defined pressure Pej lower than the pressure Pa of the external ambient medium.

Advantageously, another method of said method consists in:

admitting a primary fluid into the upstream channel, said upstream channel converging from upstream to downstream, and said primary fluid having in the downstream portion of said upstream channel a pressure Pp which is lower than the pressure Pa of the external ambient medium, and a speed Vp compatible with a flow having little disturbance, and a mass flow rate Dp;

driving the turbine in rotation by passing said primary fluid over the blades of said turbine;

injecting a secondary fluid into the downstream ejection channel, said secondary fluid, on injection, presenting a determined pressure Ps greater than the pressure Pa, a determined speed Vs greater than Vp, and a determined mass flow rate Ds;

intimately mixing the primary and secondary fluids in the downstream channel; and ejecting said mixture at the outlet of the downstream channel at a defined pressure Pej lower than the pressure Pa of the ambient medium.

Advantageously, the method of the invention, and its variants, is a method of driving a turbine in rotation at a reference speed that is variable, and it further consists in:

continuously measuring a magnitude representative of the real speed of rotation of the turbine;

converting said magnitude into terms of speed;

comparing said speed with the reference speed of rotation; and continuously modifying one or more flow parameters so that the nominal operating point of the turbine corresponds to the reference operating point.

Advantageously, dimensional parameters of the turbine device are modified by varying: the primary fluid inlet section, the secondary fluid injection section, the downstream channel ejection section.

Advantageously, operational parameters of the turbine device are modified by varying: the secondary fluid injection pressure, the pressure Pej.

The turbine device of the invention is described below.

In the embodiment shown in FIG. 1, the device essentially comprises a generally circularly symmetrical body (11), containing:

an upstream primary fluid feed channel (2);

a turbine (1);

a downstream ejection channel (3);

injection means (15); and monitoring and regulation means (17) constituted by:
  a stop valve (22);
  measurement means (18);
  acquisition means (19); and
  regulation means comprising processor means (20) and actuators (21).

Figure 10:
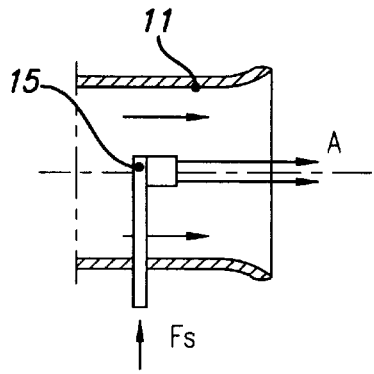
FIG. 10 is a fragmentary diagrammatic longitudinal section view showing central injection of primary fluid.
Figure 11:
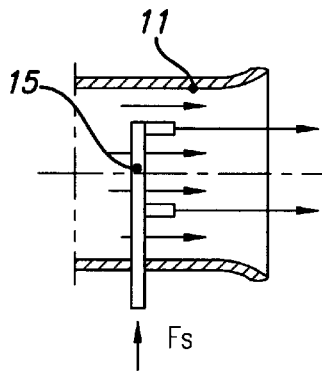
FIG. 11 is a fragmentary diagrammatic longitudinal section view showing median injection of primary fluid.
Figure 12:
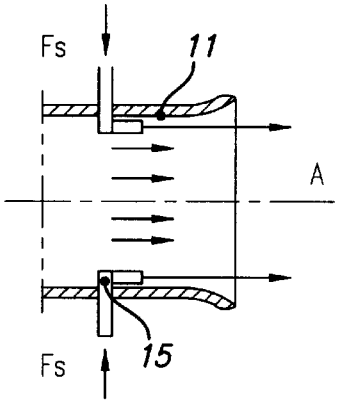
FIG. 12 is a fragmentary diagrammatic longitudinal section view showing peripheral injection of primary fluid.
Figure 13:
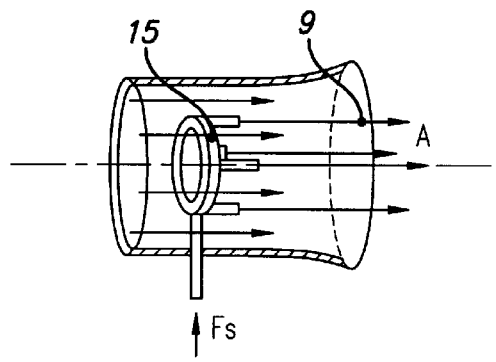
FIG. 13 is a fragmentary diagrammatic longitudinal section view showing axial injection of primary fluid.
Figure 14:
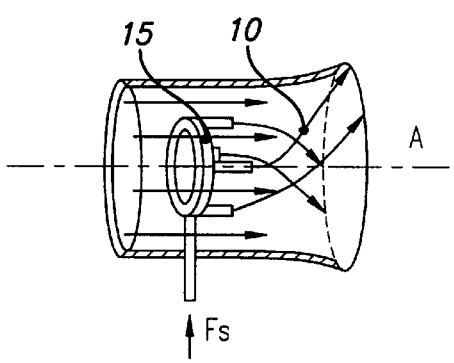
FIG. 14 is a fragmentary diagrammatic longitudinal section view showing helical injection of primary fluid.
Figure 15:
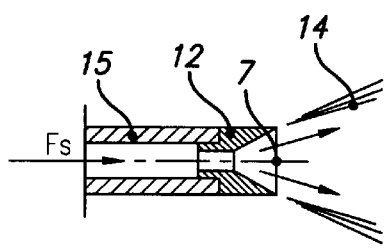
FIG. 15 is a fragmentary diagrammatic longitudinal section view showing injection of primary fluid via a nozzle.
Figure 16:
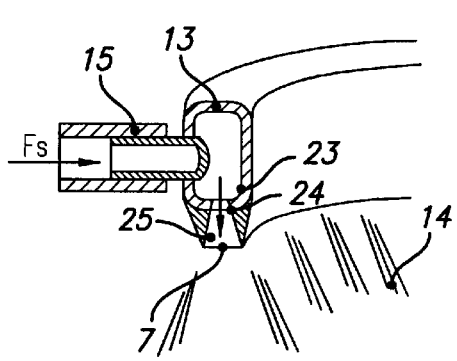
FIG. 16 is a fragmentary diagrammatic longitudinal section view showing injection of primary fluid via an annular injector.

The secondary fluid injection means (15) can be implemented by varying three conditions:

position:
  central position injection into the downstream channel (3) as shown in FIG. 10;
  median position injection into the downstream channel (3) as shown in FIG. 11; and
  peripheral position injection into the downstream channel (3) as shown in FIG. 12;

direction:
  injection in an axial direction (the jets are parallel to the axis of the downstream channel) into the downstream channel (3) as shown in FIG. 13; and
  injection in a helical direction (the jets wind helically around the axis of the downstream channel) into the downstream channel (3) as shown in FIG. 14; and shape:
  injection by means of a nozzle (12) as shown in FIG. 15, situated by a calibrated orifice followed by a small diverging channel terminating in an ejection section (7); and injection via an annular injector (13) as shown in FIG. 16, constituted by an annular section opening out into an annular converging channel (23) followed by an annular calibrated section (24) then followed by a diverging channel (25) terminating in an ejection section (7) for ejecting into the downstream channel (3).

Injecting the secondary fluid creates a Venturi effect. With reference to FIG. 1, the primary fluid is sucked from the upstream channel (2) through the turbine (1) into the downstream channel (3). The primary and secondary fluids mix in the downstream portion of the downstream channel (3). In conventional manner, the energies of the expansion streams (14) shown in FIGS. 15 and 16 can participate in improving the mixing.

For the device shown in FIG. 1, axial injection is performed via a nozzle in the central position. The mixture is ejected into the ambient medium at pressure Pa downstream from the downstream channel (3) via the section (5); the object of such a channel is to match the pressure of the outlet fluid to the pressure Pa of the medium present around the outlet section (5).

The turbine device is also associated with monitoring and regulation means (17) which comprise:

a safety stop valve (22) placed upstream from the secondary fluid injection device; this stop valve is controlled by the processor means (20);

measurement means (18) for measuring a magnitude representative of the speed of rotation of the turbine (1): by way of example the measurement means may be constituted by piezoelectric pressure sensors or by inductive sensors (only one of which is shown in FIG. 1); reliability constraints of the application determine the number of sensors that need to be installed;

acquisition means (19) which receive and match the electrical magnitudes measured by the means (18);

processor means (20) which define the instantaneous speed of rotation of the turbine and which compare said measured speed with a reference speed of rotation; if the measured speed and the reference speed are different, then the processor means issue a command; and actuators (21) constituted in this case by a pressure regulator, and under the control of the processor means (20).

Figure 6:
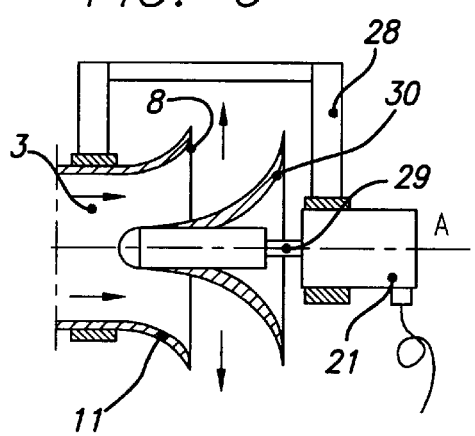
FIG. 6 is a fragmentary diagrammatic longitudinal section view showing radial ejection.
Figure 7:
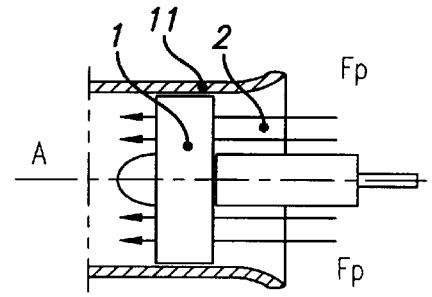
FIG. 7 is a fragmentary diagrammatic longitudinal section view showing axial admission.
Figure 8:
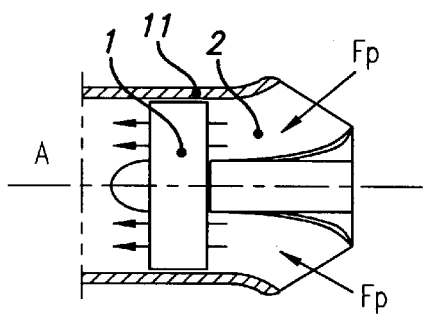
FIG. 8 is a fragmentary diagrammatic longitudinal section view showing axial-radial admission.

FIG. 6 shows an embodiment in which the ejection section (5) is varied by means of an actuator (21); in this embodiment the actuator (21) is an electric motor for servo-controlling position. It is secured to the body (11) by a bracket (28). It rotates a threaded rod (29) which screws into tapping formed in a collar (30). The collar is guided to move in translation along the axis A of the device with the collar moving towards or away from the ejection section (5) depending on the direction of rotation of the motor of the actuator (21), thereby varying the size of the ejection section.

Figure 9:
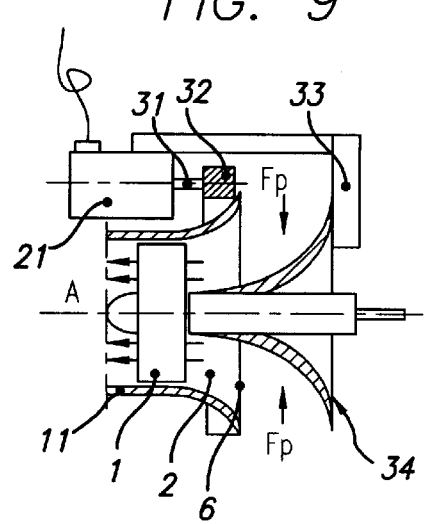
FIG. 9 is a fragmentary diagrammatic longitudinal section view showing radial admission.

FIG. 9 shows an embodiment in which the admission section (6) is varied by means of an actuator (21). In this embodiment, the actuator (21) is an electric motor for servo-controlling position. It is secured to the collar (34) of a bracket (33). It rotates a threaded rod (31) which screws into tapping (32) secured to the body (11). Said body is guided in translation along the axis A of the device to move towards or away from the collar (34) depending on the direction of rotation of the motor of the actuator (21), thereby varying the size of the section (6).

Figure 2:
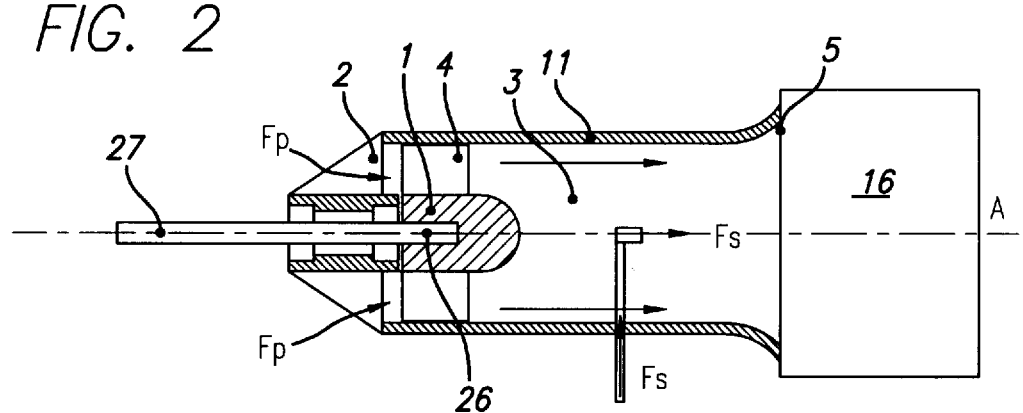
FIG. 2 is a diagrammatic longitudinal section view showing a first variant of the operating method of the invention.

FIG. 2 shows a first variant of the device of the invention. Its description is identical in all points to that relating to the device shown in FIG. 1 with the exception of considerations concerning the ejection section (5) and the downstream portion of the section.

The suction generator (16) is located downstream from the section (5). The generator (16) is a suction unit which generates at this section a pressure Pej that is lower than the pressure Pa of the ambient medium around the device. The purpose of the downstream channel (3) terminated by the section (5) is to match the pressure of the mixed fluid (Fp+Fs) in the section (5) to the pressure Pej created by said generator (16).

Advantageously, the suction unit (16) is controlled by the processor means (20) to vary the pressure Pej and/or the mass flow rate Dp of the primary fluid Fp.

Figure 3:
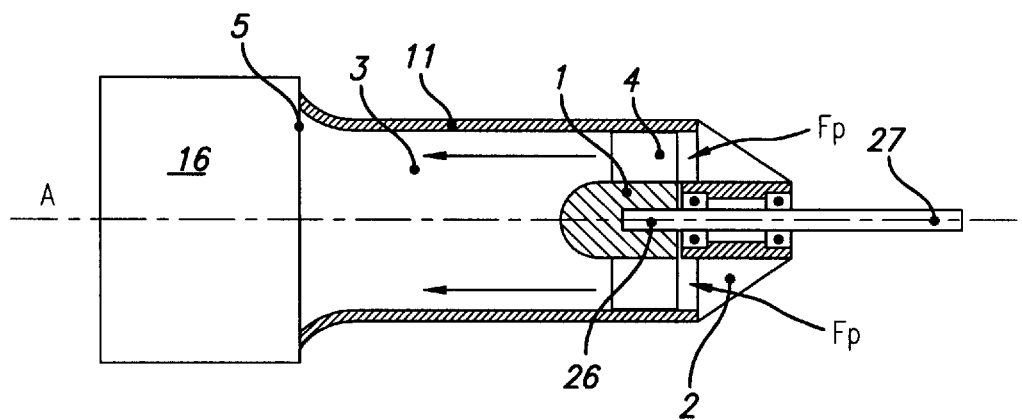
FIG. 3 is a diagrammatic longitudinal section view showing a second variant of the operating method of the invention.
Figure 4:
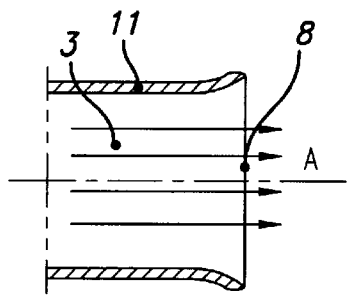
FIG. 4 is a fragmentary diagrammatic longitudinal section view showing axial ejection.
Figure 5:
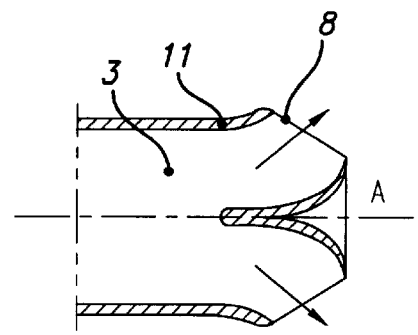
FIG. 5 is a fragmentary diagrammatic longitudinal section view showing axial-radial ejection.

FIG. 3 shows a second variant of the device of the invention. Its description is identical in all points to that relating to the device shown in FIG. 2 except for considerations relating to the secondary fluid Fs and the means for injecting it (15).

The primary fluid Fp is put into movement solely by the suction created by the suction generator (16).

Said generator (16) is placed downstream from the section (5). Said generator (16) is a suction unit. At said section it creates a pressure Pej that is lower than the pressure Pa of the ambient medium surrounding the device. The purpose of the downstream channel (3) terminated by the section (5) is to match the pressure of the fluid Fp in the section (5) to the pressure Pej created by said generator (16).

Advantageously, the suction unit (16) is controlled by the processor means (20) to vary the pressure Pej and/or the mass flow rate Dp of the primary fluid Fp.

It should be observed that in the embodiments where a secondary fluid Fs is injected, the number of ducts conveying secondary fluid to the downstream channel (5) can be varied, in particular when injection via a nozzle is used (FIG. 15). It is advantageous to distribute a plurality of such ducts around the circumference of the downstream channel (3).

The shaft of the turbine can advantageously be constituted directly by the drive shaft (26) of a tool (27). In the non-limiting example of such an embodiment shown in FIGS. 1,2, and 3, the turbine (1) is a force-fit on the rear portion (26) of the drive shaft of the tool (27). In a variant, the tool can be associated with an intermediate fixing piece (not shown).

The rotary assembly made in this way is constituted by a small number of parts that are simple, cheap, and of low inertia around the axis of the rotation.

Given the moderate speeds of rotation of the device, it is possible to guide the turbine shaft in translation and in rotation by means of bearings that are simple, unsophisticated, and of low cost as are commonly used in industry at present: ball bearings or smooth bearings.

One of the advantages of the present invention is its light weight, its quiet operation compared with conventional turbines, its reliability, and its lack of sophistication.

Naturally, the present invention is not limited to the embodiments described and covers any variant available to the person skilled in the art.

What is claimed is:

1. A method of driving a turbine in rotation, said turbine being connected to an upstream fluid feed channel and to a downstream ejection channel, said method comprising the steps of:

admitting a primary fluid into said upstream fluid feed channel, said upstream channel converging from upstream to downstream for generating a flow of said primary fluid at a mass flow rate Dp, and said primary fluid having, in a downstream portion of said upstream channel, a pressure Pp which is lower than the pressure Pa of an external ambient medium, a speed Vp, and a flow which is substantially without disturbances;

driving said turbine in rotation by passing said primary fluid over the blades of said turbine;

injecting a secondary fluid into said downstream channel, said secondary fluid having a pressure Ps greater than said pressure Pa, a speed Vs greater than said speed Vp, and a flow rate Ds less than said mass flow rate Dp of said primary fluid;

mixing said primary and secondary fluids in said downstream channel to obtain a homogeneous mixture in said downstream channel having a mass flow rate substantially equal to the sum of said mass flow rates Dp and Ds of said primary and secondary fluids; and ejecting said mixture at the outlet of said downstream channel into said ambient medium via an outlet section of said downstream channel.

2. A method according to claim 1, wherein said mixture is ejected at an outlet of said downstream channel at a pressure Pej that is lower than said pressure Pa of said external ambient medium, said pressure Pej being applied to said outlet section of said downstream channel.

3. A method according to claim 1, for driving a turbine in rotation at a reference speed that is variable, the method further comprising the steps of:

continuously measuring a magnitude representative of the speed of rotation of said turbine;

converting said magnitude into terms of speed;

comparing said speed of rotation of said turbine with said reference speed of rotation; and continuously modifying one or more flow parameters so that said turbine operates at a nominal operating point at said reference speed.

4. A method according to claim 1, wherein said turbine has a nominal operating point that is controlled by performing at least one of the following steps:

modifying an admission section for said primary fluid into said upstream feed channel;

modifying an injection section for the secondary fluid into the downstream channel;

modifying an outlet section of the downstream channel;

modifying the injection pressure of the secondary fluid;

modifying the mass flow rate of the secondary fluid;

modifying the mass flow rate of the primary fluid.

5. A method according to claim 1, wherein said secondary fluid is injected into said downstream channel according to at least one of the following steps:

using injection in an axial direction;

using injection in a helical direction;

using injection that is positioned close to the axis of the body;

using injection that is positioned close to the walls of the body;

using injection that is positioned between the axis and the wall of the body;

via one or more nozzles of circular section;

via one or more nozzles of annular section.

6. A method according to claim 1, wherein said secondary fluid is injected into said downstream channel at a speed that has at least one of the following characteristics:

said speed is supersonic, and said speed presents energetic expansion streams in the vicinity of injection of said fluid into said downstream channel.

7. A method according to claim 1 wherein said stop of ejecting said mixture further comprises ejecting said mixture at a pressure which is substantially equal to said pressure Pa of said ambient medium.

8. A turbine device comprising:

a body containing a turbine, an upstream channel for feeding fluid to the turbine, and a downstream channel for ejecting fluid;

injection means for injecting a secondary fluid into said downstream channel, said secondary fluid having a pressure Ps, a speed Vs, and a mass flow rate Ds; and admission means for admitting a primary fluid into said upstream channel;

said upstream channel having an inlet section for admitting said primary fluid at a mass flow rate Dp, a speed Vp, and a pressure Pp that is lower than a pressure Pa of an external ambient medium, wherein said pressure Ps is much greater than said pressure Pp and said speed Vs is much greater than said speed Vp;

said injection means being adapted to deliver said secondary fluid at said pressure Ps and at said speed Vs, and being configured to enable a uniform mixture to be obtained inside said downstream channel, said mixture having a mass flow rate substantially equal to the sum of the mass flow rates Dp and Ds; and said downstream channel having an outlet section for ejecting said mixture into said external ambient medium.

9. A device according to claim 8, wherein said mixture is ejected from said outlet of said downstream channel at a pressure Pej lower than said pressure Pa of said external ambient medium, said pressure Pej being applied to said outlet section of said downstream channel by a suction generator.

10. A device according to claim 8 adapted to drive said turbine at a reference speed that is variable, said device further including monitoring and regulation means comprising at least one of the following means:

measurement means for measuring the speed of rotation of said turbine;

acquisition means for acquiring said measured speed of rotation;

processor and control means adapted to compare said measured speed of rotation with a reference speed of rotation;

actuators adapted to regulate at least one of the following flow parameters: the pressure Ps of the secondary fluid, the pressure Pej delivered by the generator, the mass flow rate Ds of the secondary fluid, the mass flow rate Dp of the primary fluid, the injection section of the secondary fluid, the admission section of the primary fluid, and the ejection section of the downstream channel wherein the measured value of the speed of rotation is caused to coincide with said reference speed, said actuators being controlled by said processor and control means; and a stop valve.

11. A device according to claim 8, further according to one of the following:

said downstream channel is oriented radially;

said downstream channel is oriented axially;

said upstream channel is oriented radially;

said upstream channel is oriented axially.

12. A device according to claim 8, wherein said injection means further comprises one of the following:

said injection means includes at least one duct adapted to inject said secondary fluid along the wall of said downstream channel;

said injection means includes at least one duct adapted to inject the secondary fluid into the downstream channel in a radially median position;

said injection means includes at least one duct adapted to inject the secondary fluid into the downstream channel in a central position;

said injection means is constituted by at least one nozzle;

said injection means is constituted by an annular space inside the downstream channel, said annular space having an annular converging section, an annular throat section, and an annular diverging section through which said secondary fluid is injected into said downstream channel.

13. A device according to claim 8, wherein the rotary shaft of said turbine is constituted by a shaft of a tool driven by the turbine.

14. A device according to claim 8 wherein said outlet section of said downstream channel is adapted to cause the pressure of said mixture to be substantially equal to said pressure Pa of said external ambient medium at said outlet section.

15. A method of driving a turbine in rotation, said turbine being connected to an upstream fluid feed channel and a downstream ejection channel, said method comprising the steps of:

admitting a fluid into said upstream fluid feed channel, said upstream channel converging from upstream to downstream for generating a flow of said fluid at a mass flow rate Dp, and said fluid having in a downstream portion of said upstream channel a pressure Pp which is lower than the pressure Pa of an external ambient medium, a speed Vp, and a flow which is substantially without disturbances;

driving said turbine in rotation by passing said fluid over the blades of said turbine; and ejecting said fluid at the outlet of said downstream channel at a pressure Pej less than said pressure Pa of said external ambient medium, said pressure Pej being applied to an outlet section of said downstream channel.

16. A method according to claim 15, for driving a turbine in rotation at a reference speed that is variable, the method further comprising the steps of:

continuously measuring a magnitude representative of the speed of rotation of said turbine;

converting said magnitude into terms of speed;

comparing said speed with said reference speed of rotation; and continuously modifying one or more flow parameters so that said turbine operates at a nominal operating point at said reference speed.

17. A method according to claim 15, wherein said turbine has a nominal operating point that is controlled by performing at least one of the following steps:

modifying an admission section for said primary fluid into the upstream feed channel;

modifying an injection section for the secondary fluid into the downstream channel;

modifying an outlet section of the downstream channel;

modifying the injection pressure of the secondary fluid;

modifying the mass flow rate of the secondary fluid; and modifying the mass flow rate of the primary flow.

18. A turbine device comprising a body containing a turbine, an upstream channel for feeding fluid to the turbine, a downstream channel for ejecting fluid, and means for admitting a fluid into said upstream channel, wherein:

said upstream fluid feed channel has an inlet section for admitting said fluid at a mass flow rate Dp, a speed Vp, and a pressure Pp that is less than a pressure Pa of an external ambient medium; and said downstream channel has an outlet section for ejecting said fluid at a pressure Pej lower than said pressure Pa of said external ambient medium, said pressure Pej being applied to said outlet section by a suction generator.

* * * * *